United States Patent
Blum et al.

(10) Patent No.: US 7,160,961 B1
(45) Date of Patent: Jan. 9, 2007

(54) MELT COATING METHOD USING A POLYESTER RESIN COMPOSITION

(75) Inventors: Rainer Blum, Ludwigshafen (DE); Manfred Eichhorst, Oststeinbek (DE); Gunther Hegemann, Hamburg (DE); Klaus-Wilhelm Lienert, Hamburg (DE)

(73) Assignee: Altana Electrical Insulation GmbH, Wesel (DE)

( * ) Notice: Subject to any disclaimer, the term of this patent is extended or adjusted under 35 U.S.C. 154(b) by 0 days.

(21) Appl. No.: 10/069,020

(22) PCT Filed: Jul. 31, 2000

(86) PCT No.: PCT/EP00/07381

§ 371 (c)(1),
(2), (4) Date: Jun. 10, 2002

(87) PCT Pub. No.: WO01/14473

PCT Pub. Date: Mar. 1, 2001

(30) Foreign Application Priority Data

Aug. 21, 1999 (DE) ................................ 199 39 759

(51) Int. Cl.
*C08F 2/46* (2006.01)
*B05D 7/00* (2006.01)
*B05D 3/06* (2006.01)
*C08G 63/52* (2006.01)

(52) U.S. Cl. ................ 525/440; 427/385.5; 427/407.1; 427/487; 427/493; 427/521; 522/107; 522/179; 528/302; 528/303

(58) Field of Classification Search .................. 525/43, 525/44, 28, 444, 445
See application file for complete search history.

(56) References Cited

U.S. PATENT DOCUMENTS

| | | | | |
|---|---|---|---|---|
| 4,777,209 A | * | 10/1988 | Hefner, Jr. .................... | 525/28 |
| 5,342,554 A | | 8/1994 | McBain ...................... | 523/466 |
| 5,763,099 A | | 6/1998 | Misev .......................... | 428/482 |
| 6,133,337 A | * | 10/2000 | Blum et al. ................. | 522/104 |
| 6,787,581 B1 | * | 9/2004 | Blum et al. ................. | 522/104 |

FOREIGN PATENT DOCUMENTS

| | | |
|---|---|---|
| EP | 0702067 | 3/1996 |
| WO | 8603757 | 7/1986 |
| WO | 9725361 | 7/1997 |
| WO | 9738020 | 10/1997 |

* cited by examiner

*Primary Examiner*—Randy Gulakowski
*Assistant Examiner*—Timothy J. Kugel
(74) *Attorney, Agent, or Firm*—Friedrich Kueffner

(57) ABSTRACT

The invention relates to cast resins containing A) at least one solid unsaturated polyester and B) at least one oligomer and/or polymer cross-linking agent that can be copolymerised therewith, said cross-linking agent having at least one terminal and/or lateral propenyl-, isoprenyl- and/or (meth) acrylester group in relation to the oligomer- and/or polymer main chain. The invention also relates to the use of cast resins as casting beans and impregnants and as coating agents. The invention further relates to a method for melt impregnating or melt coating components, absorbent mattes or grounded or ungrounded substrates with the cast resins.

9 Claims, No Drawings

MELT COATING METHOD USING A POLYESTER RESIN COMPOSITION

This application is the National Phase of International Application PCT/EP00/07381 filed Jul. 31, 2000, which designated the U.S. The PCT application is hereby incorporated in its entirety by reference.

BACKGROUND OF THE INVENTION

The invention relates to hot-melt resins based on unsaturated polyesters and to the use of these hot-melt resins as casting and impregnating compositions or coating materials.

Casting and impregnating compositions are hot-melt resins which are employed in particular in electrical engineering in accordance with techniques which are general knowledge, such as dipping, hot-dipping, dip-rolling, flooding, casting, vacuum impregnation, vacuum pressure impregnation or trickling for impregnating windings of electronic components.

The hot-melt resins are also suitable for impregnating absorbent materials such as carrier materials for sheetlike insulating materials, especially glass silk or mica tapes. In such applications, curing may be interrupted at the B stage, to give curable prepregs.

Moreover, the hot-melt resins may be used as coating materials for primed or unprimed substrates such as vehicle body parts, industrial components or packaging, especially metal and/or plastics substrates.

Not least, the hot-melt resins may be used to produce an abrasion protection for high-speed machine parts.

Mainly, however, the hot-melt resins are used as casting and impregnating compositions for electrical and electronic components.

The majority of known casting and impregnating compositions for electrical components such as motor windings or transformer windings are liquid formulations based on unsaturated polyesters, which are in solution in compounds containing vinylic and/or allylic unsaturation, such as styrene, (alpha-methylstyrene, vinyltoluene, allyl phthalates and monomeric or oligomeric acrylic or vinyl esters. Also known, furthermore, are liquid compositions based on dicyclopentadienyl(DCPD)-modified unsaturated polyester resins, which can be cured without additional liquid and/or solid comonomers.

A disadvantage of these known casting and impregnating compositions is the use of the abovementioned monomers, which are vital for establishing the required, relatively low processing viscosities and for the curing of the unsaturated polyester resins. These monomers are injurious to health and irritant to skin. In the case of known applications of casting and impregnating compositions comprising these substances, moreover, there are mass losses of from 20 to 30%. These considerable amounts must be removed from the workplace in order to avoid health hazards for the employees. The evaporated amounts, drawn off under suction, are generally disposed of in waste-air incinerators. This gives rise to unwanted emissions. Moreover, the incineration of such quantities of material is uneconomic. Furthermore, there is a risk of these monomers not being incorporated completely in the course of curing. Residual monomers in the cured compositions may emerge, especially from electrical insulating compositions, which tend to become warm during use, and may lead to odor nuisance and health hazards. They may also gradually aftercure within the molding compounds, so undesirably altering the service properties of the said compounds.

A considerable technical problem with all liquid casting and impregnating compositions, including those curable without monomers, is the deficient storage stability of the formulations made ready for use by the addition of catalysts. In transit, especially at summer temperatures, there is always the risk of unwanted premature reactions, ranging from partial gelling to complete reaction, which is dangerous.

For these reasons, there have already been a number of attempts to use solid resins as casting and impregnating compositions. Using such hot-melt resins, it ought to be possible to reduce markedly the emissions and to improve the storage stability.

European Patent EP-A-0 101 585 proposes casting and impregnating compositions of high thermal stability and heat distortion resistance which comprise unsaturated polyesters modified with dicyclopentadiene and/or other 1,3-diolefins and as their alcohol component comprise N-hydroxyalkylimides of mono-unsaturated, unsubstituted or substituted, cyclo-aliphatic 1,2-dicarboxylic acids. The resins are processed as solutions in styrene, for example.

European Patent EP-A-0 118 786 discloses casting and impregnating compositions comprising unsaturated polyester resins which may have been modified with dicyclopentadiene, which contain cyclopentene or cyclohexene groups, and which are prepared in a complex process conducted preferably in two stages. Curing is effected at temperatures above 200° C. in the presence of free-radical initiators which decompose above 140° C., or by irradiation with electron beams. The casting and impregnating compositions are processed as solutions in styrene, for example.

European Patent EP-A-0 260 688 avoids the disadvantages of the high curing temperatures of EP-A-0 118 786, of more than 200° C., by means of a modified two-stage process in which the high temperatures of the aftercure in the second stage are reduced to 120–200° C. through the use of a specific selection of free-radical initiators.

Japanese laid-open specification JP-A-53 05 97 91 describes polyesterimide resins which are prepared using at least tribasic carboxylic acids, polyester polyols and amines. These substances are used as thermoplastic hot-melt resins for electrical insulation.

German Patents DE-A-26 48 351 and DE-A-26 48 352 relate to injection-moldable compositions which comprise unsaturated polyester resins, peroxides and fillers and are suitable for use as hot-melt resins for electrical insulation.

German Patent DE-A-16 40 428 describes the use of component-specific, ring-shaped elements made from unsaturated polyester resins, which to improve the blocking resistance are coated with waxes. These rings are placed on the winding head of the components and melted by heating, after which the resin, in the amount controlled by the ring size, flows into the components, where it cures thermally. In this process, the use of wax is required in order to ensure that the resins, which are not blocking-resistant, are storable, despite the fact that the waxes disrupt the process.

The solution proposed by German Patent DE-A-195 42 564 to the problem is to use free-radically curable resin systems comprising unsaturated polyester resins, appropriate curing agents (catalysts), if desired, comonomers and/or ethylenically unsaturated polymers such as diallyl phthalate oligomers, with or without further customary additives.

Despite the advantages of the hot-melt resins in their use as casting and impregnating compositions, and the abovementioned efforts at developing appropriate materials, no applications have been disclosed to date.

A particular problem which has been found for application is the incorporation of the free-radical initiators (e.g., peroxides) into the melts at relatively high temperatures during the formulation of the hot-melt resins. Moreover, it is difficult to incorporate the hot-melt resins into the components by melting without initiating a crosslinking reaction. With the hot-melt resins proposed to date, the stability window between processing temperature and reaction temperature is too small for reliable handling.

SUMMARY AND DESCRIPTION OF THE INVENTION

The object of the present invention is to provide new hot-melt resin from which the above-described disadvantages of the prior art are now absent and which instead have a sufficiently low melt viscosity for processing even at relatively low melt temperatures and whose crosslinking does not begin until markedly above the melting temperature but is then very rapid. The new hot-melt resins are required to exhibit excellent storage stability even at an elevated ambient temperature, to cure with virtually no emissions, and, in the cured state, to display excellent thermal stability, heat distortion resistance and electrical insulation properties.

Accordingly, we have found the novel hot-melt resins comprising
A) at least one solid unsaturated polyester and
B) at least one oligomeric and/or polymeric crosslinking agent which is copolymerizable with the said polyester and which in respect of the oligomeric and/or polymeric main chain comprises at least one terminal and/or pendant propenyl, isopropenyl and/or (meth)acrylic ester group.

In the text below, the novel hot-melt resins are referred to as "hot-melt resins of the invention".

We have also found the novel uses of the hot-melt resins of the invention as casting and impregnating compositions and as coating materials.

In the text below, the novel uses are referred to collectively as "use in accordance with the invention".

In addition, we have found the novel process for the melt impregnation or melt coating of components, absorbent materials or primed and unprimed substrates by
(i) melt-applying a hot-melt resin,
(ii) applying the resultant resin melt onto and into the components, absorbent materials or primed or unprimed substrates,
(iii) curing the applied resin melt by heat and/or actinic radiation,
which is characterized in that the hot-melt resin used comprises the hot-melt resin of the invention.

In the text below, the novel process for the melt impregnation or melt coating of components, absorbent materials or primed and unprimed substrates is referred to for short as "process of the invention".

Last but not least, we have found novel components, especially electrical components, sheetlike insulating materials based on absorbent materials, and primed and unprimed substrates, all of which comprise at least one hot-melt resin of the invention cured thermally and/or with actinic radiation.

In the text below, these articles are referred to respectively as "components of the invention", "insulating materials of the invention", "substrates of the invention" or, collectively, as "articles of the invention".

In the light of the prior art it was surprising and unforseeable for the person skilled in the art that the complex problem on which the present invention is based might be solved with the aid of the hot-melt resins of the invention.

Surprisingly, the hot-melt resins of the invention melt at relatively low temperatures and have a low melt viscosity, so that a formulation in the melt with free-radical initiators and further auxiliaries can be accomplished rapidly and gently. In the form of compositions catalyzed ready for use, the hot-melt resins have a sufficiently large processing time window for remelting and for application/incorporation onto and into the component, the absorbent material and the primed or unprimed substrate and cure outstandingly by means of heat and/or actinic radiation, such as UV light or electron beams, at a critical temperature which lies well above the melting temperature. Another great advantage is that they exhibit extremely low mass losses on processing. Consequently, hot-melt resins are provided which can be used without the solid, vinylically unsaturated reactive diluents proposed, for example, in German Patent DE-A-195 42 564. In principle, however, it is technically possible to use further solid or liquid, especially solid, ethylenically unsaturated compounds that are coreactive with the unsaturated polyesters (A) for use in accordance with the invention and with the crosslinking agents (B) for use in accordance with the invention, as reactive diluents in minor amounts. Moreover, it was surprising that the hot-melt resins of the invention may be employed with advantage in other technological fields as well, such as in the production of sheetlike insulating materials by melt impregnation or in the production of coated vehicle body parts, industrial components or packaging.

The first essential constituent of the hot-melt resins of the invention is the oligomeric and/or polymeric crosslinking agent (B) which is copolymerizable with the solid unsaturated polyester (A).

In the context of the present invention, oligomers are compounds containing on average from 2 to 15 repeating monomer units in the molecule. Polymers are compounds containing on average more than 10 repeating monomer units in the molecule.

The crosslinking agents (B) for use in accordance with the invention have at least one and in particular at least two isoprenyl, propenyl and/or acrylate groups. Advantageously, at least one, in particular at least two, propenyl and/or isopropenyl groups is or are used. These olefinically unsaturated groups are linked terminally and/or laterally, i.e. pendantly, to the oligomer and/or polymer main chain.

There is no upper limit on the number of these olefinically unsaturated groups in the crosslinking agent (B) for use in accordance with the invention. In accordance with the invention, however, it is advantageous if the number of these groups on average does not exceed 12, with particular preference 10, and in particular 8, per molecule.

The oligomer and/or polymer main chain may be linear, branched in any desired manner, or dendrimeric in structure. Preferably it is formed by saturated and/or unsaturated polyethers, polyester, polyester amides, polyester imides and/or polyurethanes, especially polyesters and/or polyurethanes.

The above-described olefinically unsaturated groups for use in accordance with the invention, especially the propenyl and isopropenyl groups, may be introduced into the said oligomers and polymers by the customary and known methods of organic chemistry and of polymer chemistry. Examples of suitable compounds for introducing these groups are propenyl ethers of polyols, isopropenylbenzyl-m-isopropyl isocyanate, 1-propenyl glycidyl ether, isoprenol, hydroxyalkyl (meth)acrylates, glycidyl (meth)acrylates and isocyanate (meth)acrylates. Numerous compounds of this kind are available on the market. Methods of preparing 1-propenyl ethers are described, for example, in J. V. Crivello et al. in Macromolekular Engineering, Plenum Press, New York, 1995.

Using the abovementioned isocyanates, glycidyl ethers and isoprenol it is possible to synthesize terminally functionalized polymeric compounds. Preference is given to polyesters and polyurethanes obtainable in accordance with the conventional rules; for example, polyurethanes from isocyanates and compounds reactive therewith, preferably hydroxyl compounds or polyfunctional hydroxyl compounds. When the particularly preferred polyesters are used, the termination of the invention may be achieved by also using the abovementioned compounds, such as isopropenyl-benzyl-m-isopropyl isocyanate, 1-propenyl glycidyl ether and isoprenol.

By way of the structure of the crosslinking agents (B) for use in accordance with the invention it is possible to determine the end properties of the cured hot-melt resins within a wide range. Linear crosslinking agents (B) without pendant and with exclusively terminal acrylate isoprenyl and/or propenyl groups produce a more wide-meshed crosslinking with longer network arcs and greater flexibility of the cured hot-melt resins. Highly branched and/or highly pendantly functionalized with crosslinking agents (B) produce a high crosslinking density and, after the curing of the hot-melt resins, hard or else brittle impregnations or coatings.

In addition to the above-described olefinically unsaturated groups which are essential to the invention, the crosslinking agents (B) may also comprise the structural units of the general formula I and/or II described below. These structural units are introduced into the crosslinking agents (B) as described below for the polyesters (A) for use in accordance with the invention.

It is preferred to use oligomeric crystalline or partially crystalline crosslinking agents (B).

In accordance with the invention, particular advantages result from using these oligomeric crystalline or partially crystalline crosslinking agents (B) in combination with highly condensed, solid, unsaturated polyesters (A). Such combinations display the desired melting characteristics (low melting temperature, low melt viscosity at temperatures in the vicinity of the melting temperature, i.e., a steep course of the curve of viscosity over temperature), a good melt stability even in the presence of catalysts and, after curing, produce particularly heat-stable impregnations and coatings.

In accordance with the invention, however, it is also of advantage to combine unsaturated polyesters (A) which have lower degrees of condensation and/or have been prepared using monofunctional substances with polymeric crosslinking agents (B).

A further key advantage of the hot-melt resins of the invention is that the weight ratio of polyester (A) to crosslinking agent (B) may be varied very widely, so giving hot-melt resins of the invention with a very wide variety of profiles of properties. By this means it is possible to tailor the hot-melt resins of the invention simply and advantageously to a very wide variety of end uses. Advantageously, the weight ratio (A):(B) is from 5:1 to 1:5, with particular preference from 4:1 to 1:3, with very particular preference from 3:1 to 1:1.5, and in particular from 2.5:1 to 1:1.2. Accordingly, the amount of crosslinking agents (B) for use in accordance with the invention in the hot-melt resins of the invention may vary very widely. In accordance with the invention it is of advantage if the crosslinking agents (B) are present in the hot-melt resins of the invention in an amount, based in each case on the hot-melt resins, of from 2 to 60% by weight, preferably from 3 to 55% by weight, with particular preference from 5 to 50% by weight, and in particular from 7 to 45% by weight.

The other essential constituents of the hot-melt resins of the invention are the solid unsaturated polyesters (A).

Examples of suitable polyesters (A) for use in accordance with the invention are polyesters which are known per se and which have structural units of the general formula I and/or II, which are derived from dicyclopentadiene (DCPD).

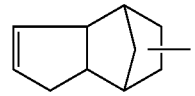

(I)

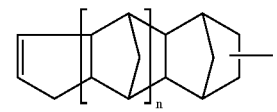

(II), in which the index n is an integer from 1 to 10.

Preferably, these groups are introduced by way of the readily obtainable esterlike DCPD adducts, in accordance with the formulae III and IV, with polycarboxylic acids:

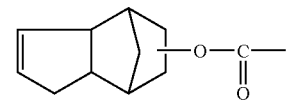

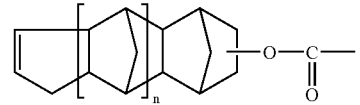

(IV) in which the index n is an integer from 1 to 10.

The adducts of maleic anhydride and water with DCDP, in accordance with the formulae V and VI, are very readily obtainable:

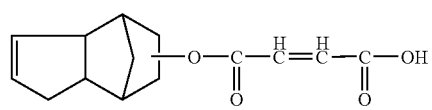

(V)

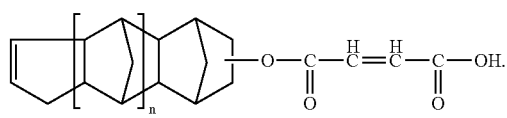

(VI)

Moreover, dihydrodicyclopentadienol of formula VII is available commercially and may also be used when synthesizing the unsaturated polyesters. Doing so likewise introduces the structures of the formulae I and II and produces unsaturated polyesters (A).

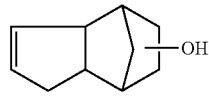

(VII)

The synthesis of the polyesters (A) for use in accordance with the invention takes place by the prior art processes for preparing polyesters, generally by polycondensation of polyfunctional hydroxyl compounds with polyfunctional acids and/or their anhydrides at relatively high temperatures. It may be advantageous to start from the esters of such compounds and to obtain the polyesters (A) by transesterification at relatively high temperatures, since such transesterifications in some cases proceed more readily and more rapidly than direct esterification. The unsaturated nature of the polyesters (A) comes about through the use of unsaturated compounds in the acid component and/or unsaturated alcohol component, such as, for example, alkenediols and/or alkoxylated alkenediols. Preferably, unsaturated polyester resins (A) are obtained with maleic acid and/or maleic anhydride and/or fumaric acid. These compounds are available industrially at very favorable cost. Moreover, it is also possible, by using polyfunctional amines, to obtain polyesters (A) having amide structures. The use of monofunctional starting materials is also possible in order, for example, to regulate the molecular weight.

Examples of suitable compounds for the synthesis of the unsaturated polyesters (A) are adipic acid, suberic acid, phthalic acid isomers, tetrahydro-phthalic acid, endomethylenetetrahydrophthalic acid, hexahydrophthalic acid, fumaric acid, maleic acid, itaconic acid, citraconic acid, trimellitic acid, pyro-mellitic acid, ethylene glycol, polyethylene glycols, propylene glycol, polypropylene glycols, butanediol isomers, hexanediol, neopentyl glycol, trimethylol-propane, glycerol, pentaerythritol, bisphenol A, tris-hydroxyethyl isocyanurate (THEIC), OH-polyfunctional polymers, such as hydroxyl-modified polybutadienes or hydroxyl-bearing polyurethane prepolymers and epoxy resins, polyfunctional natural substances or their derivatives, such as linseed oil fatty acid, dimeric and polymeric linseed oil fatty acid, castor oil, and castor oil fatty acid. Hydrogenated bisphenol A (dicyclohexanolpropane) is very suitable for the present invention for synthesizing the polyesters (A) and crosslinking agents (B) since its use produces good blocking resistance of the materials coupled with relatively low melt viscosity. It is also possible to introduce amide and imide structures. The introduction of such structures is known to the person skilled in the art, for example, from German Patents DE-A-15 700 273 and DE-A-17 200 323. Such polyester amides or polyester imides (A) may in many cases meet particular requirements, in respect of thermal stability, for example, better than do straight polyesters (A).

The introduction of the structural units in accordance with the formulae I and II may take place preferably through the use of acidic esters in accordance with the formulae III to VI during the product condensation. Oligo-DCPD mixtures may be obtained in a manner known per se by polycycloaddition of cyclopentadiene under pressure at temperatures between 170 and 300° C. The reaction products may subsequently be worked up by distillation or reacted directly, with maleic anhydride and water, for example, to the compounds of the formulae V and VI. A further possibility is to prepare polyesters (A) with an excess of acid and then to react them with DCPD. A high conversion requires the use of catalysts, such as boron trifluoride etherate. At higher temperatures and pressure, oligo-DCPD structures are also formed.

Where the polyesters (A) contain double bonds in the polymer chain, as maleic or fumaric esters, for example, grafting with cyclopentadiene produces endomethylenetetrahydrophthalic acid structures in accordance with the formula VIII:

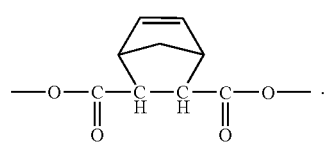

(VIII)

For the particular use intended, specific requirements in respect of hardness, elasticity, viscosity, softening point or the like may be imposed on the polyesters (A) from which the hot-melt resins of the invention have been synthesized. In respect of these particular requirements, the synthesis of the polyesters (A) then takes place in accordance with rules known per se to the person skilled in the art. For instance, the (partial) crystallinity of the polyesters (A) and the elasticity of cured polyesters (A) are varied by the selection and the chain length of the polyols or polycarboxylic acids. For example, polyesters (A) synthesized using hexanediol or adipic acid are more flexible than those based on phthalic acid and ethylene glycol. Also known to the person skilled in the art is the control of the properties through the use of polyfunctional substances which produce branching in the polyester molecules, such as trimellitic acid or trimethylolpropane.

The amount of polyesters (A) for use in accordance with the invention in hot-melt resins of the invention may vary widely. In this way it is further possible to tailor the profile of properties of the hot-melt resins of the invention to the particular end use, in a simple and advantageous manner. In accordance with the invention it is of advantage if the polyesters (A) are present in the hot-melt resins of the invention in an amount, based in each case on the hot-melt resins, of from 5 to 90% by weight, preferably from 7 to 85% by weight, with particular preference from 9 to 80% by weight, and in particular from 11 to 75% by weight.

The hot-melt resins of the invention may further comprise customary and known additives in effective amounts. Examples of suitable additives are curing accelerators, photoinitiators, pigments and/or fillers.

Examples of suitable curing accelerators are compounds which form free radicals on heating. Examples of known free-radical formers are peroxides, azo compounds, azides and C—C-labile substances, as described in German Patent DE-A-26 32 294. A considerable acceleration of the curing, or reduction in curing temperature, is obtainable with metal coinitiators such as compounds of cobalt, manganese, iron, nickel or lead.

Examples of suitable photoinitiators are UV initiators of Norrish type 1 or H donor/acceptor systems (Norrish type 2). For further details, reference may be made to Römpp Chemie Lexikon, 9th, expanded and revised edition, Georg Thieme Verlag Stuttgart, Vol. 4, 1991. The UV reactivity of the photoinitiators is particularly high when the unsaturated polyesters (A) and/or the crosslinking agents (B) contain the H-acceptor groups in chemically bonded form. This can be achieved through the use of cocondensable phenone compounds, such as hydroxybenzophenone, bishydroxybenzophenone or benzophenonecarboxylic acids and/or their anhydrides, in the polycondensation of the polyesters (A).

Examples of suitable pigments and/or fillers are examples of suitable inorganic color pigments (D) are titanium dioxide, iron oxides, Sicotrans yellow and carbon black. Examples of suitable organic color pigments are indanthrene blue, Cromophthal red, Irgazine orange and Heliogen green.

Furthermore, the coating material of the invention may comprise organic and inorganic fillers (D) in customary and known, effective amounts. Examples of suitable fillers are chalk, calcium sulphates, barium sulphate, silicates such as talc or kaolin, silicas, oxides such as aluminium hydroxide or magnesium hydroxide, nanoparticles based on silicon dioxide, aluminum oxide or zirconium oxide or organic fillers such as textile fibers, cellulose fibers, polyethylene fibers or wood flour. For further details, reference is made to Römpp Lexikon "Lacke und Druckfarben" Georg Thieme Verlag, Stuttgart, 1998, pages 250 to 252;

Further examples of suitable additives are described in the text book "Lackadditive" [Coatings additives] by Johan Bieleman, Wiley-VCH, Weinheim, N.Y., 1998.

The amount of the above-described additives in the hot-melt resins of the invention may vary very widely and is guided primarily by their function. The person skilled in the art will therefore be able easily to determine the appropriate amount of additives in each case, on the basis of his or her technical knowledge, with or without the aid of simple rangefinding tests. For example, the curing accelerators may be present in an amount of up to 15% by weight, the photoinitiators in an amount of up to 10% by weight and the pigments and/or fillers in an amount of up to 90% by weight, based in each case on the hot-melt resin of the invention.

The preparation of the hot-melt resins of the invention in their ready-to-use formulations has no special features as to its method but instead takes place by mixing melts of the constituents (A) and (B) and, if desired, of the additives. The melts may be run off into appropriate transport containers or, preferably, discharged in melt form and then converted by known techniques into granules, pillets or flakes. In addition, it is of interest to convert the melts into shaped parts adapted in their form and size to the components to be impregnated, to the absorbent substances to be impregnated or to the primed and unprimed substrates to be coated, these parts being placed, for example, onto the components, absorbent substances or substrates and being able by heating to flow into or over these components, substances or substrates. The hot-melt resins of the invention do not require the use of wax to obtain blocking-resistant, component-specific moldings, which is a further particular advantage of the hot-melt resins of the invention.

Otherwise, the hot-melt resins of the invention, after they have been melted, may be applied by dipping, hot-dipping, dip-rolling, flooding, casting, vacuum impregnation, vacuum pressure impregnation or trickling onto and into the optionally preheated components, especially the electronic components, onto and into the optionally preheated absorbent substances, especially the glass silk or mica tapes, or to the primed or unprimed substrates to be coated, especially the vehicle body parts provided with an electrodeposition coating, or the packaging, or the plastics parts provided with a water-based primer.

Also possible is an application in the manner of polymer injection molding, in which case the component to be insulated is implemented in the injection mold. Thus it is possible, for example, to mass-produce small parts rapidly.

Melting may take place, for example, in the course of flow through a heat exchanger. Preference is given to combinations of melting devices and integrated and/or downstream mechanical conveyance, e.g. metering melt screw devices (extruders).

The applied hot-melt resins may be partly gelled before actual curing. This has the advantage that dripping losses can be avoided.

In accordance with the invention, the resins are cured by thermal curing by means of electricity, induction, hot fluids, especially hot inert gases, microwave radiation and/or IR radiation, especially near infrared (NIR) radiation. Particular advantages result from the use of IR radiation and especially NIR (approximately 700–1300 nm). It is also possible to use any desired combination and sequence of the abovementioned methods for curing.

In accordance with the invention, the hot-melt resins of the invention may also be cured with actinic radiation. Suitable actinic radiation includes electromagnetic radiation and/or corpuscular radiation. UV light (electromagnetic radiation) and/or electron beams (corpuscular radiation) are particularly suitable.

In accordance with the invention it is before part to combine the two curing methods with one another.

For example, the applied hot-melt resins of the invention may first be surface-cured with UV light and then cured to completion, with heating, using compounds which on heating produce free radicals.

In the field of electrical insulation, curing takes place by exposure to high-energy radiation, preferably UV light, or by means of heat, preferably oven heating and/or IR heating, especially by NIR. With particular preference, combined curing with UV light and/or NIR and heat is employed. A technical advantage of the hot-melt resins of the invention in this respect is their high UV and heat reactivity at comparatively low temperatures of below 180° C., preferably below 140° C. This is in association with good melt stability at temperatures only slightly below the reaction temperature. This ensures that the hot-melt resins can be prepared and applied from the melt without premature reaction and without the electrical components being destroyed by high temperatures during the curing of their insulating compositions. Moreover, the electronic components may be produced rapidly in rational mass production, since curing is rapid. These advantages also result in the context of the use of the hot-melt resins of the invention in the other above-described technological fields.

Also of very particular importance is the use of NIR, since it penetrates deep into the applied hot-melt resins of the invention and thus brings about rapid and uniform heating with only a small temperature difference over the thickness of the coat, and so permits the curing even of thick coats without heating the component, the absorbent material or the substrate as a whole. Longwave IR radiation is absorbed substantially at the surface, with in-depth heating being possible only by way of slow heat flux; in other words, a large temperature difference is produced with the consequence of non-uniform curing over the thickness of the coat.

The abovementioned curing processes may also be performed until a B stage, i.e. a part-cured stage is reached. Subsequently, curing is interrupted and can be recommenced at a later point.

A curing process which is especially advantageous for electrical insulating hot-melt resins consists in first carrying out surface curing with UV light and then carrying out further curing, with heating, using substances which on heating produce free radicals. If the hot-melt resins of the invention are to be used as casting and impregnating compositions, i.e. for preparing insulating compositions in electrical windings, the insulating composition in the interior of the electronic components is first of all cured in whole or in part by means of Joule heat. Subsequently, a surface which may have cured poorly is aftercured or postcrosslinked with IR radiation, preferably NIR radiation and/or UV light, the insulating composition in the interior of the windings also being crosslinked further, possibly, by means of heat.

A further end use for the hot-melt resins of the invention is in the insulation and protection against mechanical abrasion of, for example, the winding head of hi-speed DIY power tools. For this purpose, the already insulated windings, heated very highly by means of Joule heat, are subjected to resin powder in a fluidized bed, for example, in the course of which a resin coat that can be determined by means of the preheating is sintered on, and crosslinked.

The articles of the invention that are impregnated or coated with the cured hot-melt resins of the invention have a much longer surface life than conventional components, insulating materials and substrates and have a more advantageous profile of properties, so making them more valuable—from an economic standpoint, too—for the user. For instance, the components of the invention, especially the electronic components of the invention, are superior to the conventional components in respect, inter alia, of freedom from tack, freedom from cracks, hardness and abrasion resistance, for example. The insulating materials of the invention have a greater weathering stability and are therefore suitable inter alia for applications under extreme climatic conditions (maritime, tropical or polar climate). The same applies to the substrates of the invention, especially the vehicle body parts, packaging or industrial components of the invention such as wheel rims, radiators or runners subject to particular heat, moisture and/or radiation stresses.

EXAMPLES

Preparation Example 1

The Preparation of the Compound 1 (Monocarboxylic Acid of formula V)

710.81 g of 93% dicyclopentadiene (5.0 mol)

490.30 g of maleic anhydride (5.0 mol)

are weighed out into a stirring flask with heating and reflux condenser. The mixture is heated to 125° C. under a gentle stream of nitrogen and then 95.00 g of water 5.0 mol+5 g (5.0 mol+5 g)

are added from a dropping funnel over the course of one hour. The mixture is left to react at 125° C. for one hour. A monocarboxylic acid of formula V is formed.

Preparation Example 2

The Preparation of the Unsaturated Polyester (A)

1344.00 g of dicyclohexanolpropane 1033.60 g of compound 1 from Preparation Example 1

235.20 g of maleic anhydride 278.40 g of fumaric acid 630.00 g of Polyol TP 70 (1 mol trimethylolpropane+7 mol ethylene oxide)

34.00 g of hypophosphorous acid, 50% strength (esterification catalyst)

0.50 g of hydroquinone are weighed out into a stirring flask with heating and top-mounted distillation unit. The mixture is heated rapidly to 130° C. under a gentle stream of nitrogen. Then the temperature is raised gradually to 190° C. over the course of 4 1/2 hours, during which the water of condensation which forms is removed by distillation. Then a vacuum is applied and the temperature is held at 190° C. for three hours more. This gives a resin melt which is cast onto aluminum foil and solidifies to give a hard, blocking-resistant resin. The resin has an acid number of 14.7 and melt viscosities of 158 Pas/120° C.; 73 Pas/130° C.; 46 Pas/140° C.

Preparation Example 3

The Preparation of a Polyester-Based Crosslinking Agent (B) Terminated with Isoprenol Ester 1753.7 g of adipic acid (6.0 mol)

478.6 g of isoprenol (5.5 mol)

368.4 g of dicyclohexanolpropane (2 mol)

261.7 g of THEIC (trishydroxyethyl isocyanurate) (1 mol)

400.0 g of toluene 6.0 g of Fascat 4201 (tin catalyst)

(0.5 equivalent HO excess) are weighed out into a stirring vessel with heating and water separator. The mixture is heated rapidly to 130° C. under a gentle stream of nitrogen. Water is then separated off with vigorous boiling. After about 3 hours, the formation of water subsides. Then the temperature is raised gradually to 190° C. over the course of approximately 2 hours, during which the toluene unreacted isoprenol and some additional water are removed by distillation. Then a vacuum is applied and condensation is continued at 190° C. for 4 hours.

This gives a resin melt which is passed onto aluminum foil and solidifies to give a hard, blocking-resistant resin. The resin has an acid number of 17.2 and melt viscosities of 6.28 Pas/120° C.; 4.71 Pas/130° C.; 2.21 Pas/140° C.

Preparation Example 4

The Preparation of a Polyurethane-Based Crosslinking Agent (B) Terminated with Acrylic Ester/Isoprenyl 296.3 g of hexanediol (2.5 mol)

4064.2 g of hydroxyethyl acrylate (2.5 mol)

1033.6 g of isoprenol (3.5 mol)

1504.8 g of MDI (5.5 mol)

The hydroxyl components are charged to a stirring flask and at approximately 70° C. MDI is added over 30 minutes with stirring, during which the temperature is raised to 120° C.; it is held at 120° C. for a further 20 minutes and then the resultant melt is cast onto aluminum foil. After cooling, a hard, blocking-resistant resin is obtained.

The resin has a melt viscosities of 2.16 Pas/120° C.; 1.97 Pas/130° C.; 0.94 Pas/140° C.

Example 1

The Preparation of a Hot-Melt Resin of the Invention 680 g of the polyester resin (A) from Preparation Example 2

320 g of the crosslinking agent (B) from Preparation Example 3

30 g of dicumylperoxide (DCPO)

10 g of Härter BK (benzpinacol curing agent, BAYER)

3 g of hydroquinone monomethyl ether 10 g of benzophenone 25 g of benzoin are mixed in a hammer mill, ground and homogenized at 94° C. in a laboratory extruder, with a residence time of 6 minutes. The discharge from the extruder is collected on sheet aluminum and after cooling is ground.

Example 2

The Preparation of a Hot-Melt Resin of the Invention

The procedure of Example 2 is repeated except that the crosslinking agent (B) from Preparation Example 4 is used rather than the crosslinking agent (B) from Preparation Example 3.

Example 3

The Testing of the Hot-Melt Resins of Examples 2 and 3 for Melt Behavior and Reactivity (Gel Time)

Samples of the hot-melt resins of Examples 2 and 3 are melted in the plate/plate measuring apparatus of a programmable rheometer (from Physica) at approximately 90° C. under oscillating shear, the temperature is then raised to 105° C., and the time is measured at which the resin gels, i.e. the viscosity curve rapidly rises very steeply (gel time). With a further sample, starting at 100° C., a heating rate of 10 K/min is applied and the temperature is measured at which the resin gels (onset temperature).

The results of the measurement are given in the table.

Table: Melting Behavior and Reactivity of the Hot-Melt Resins of the Invention from Examples 2 and 3

TABLE

| Melting behavior and reactivity of the hot-melt resins of the invention from Example 2 and 3 | | |
|---|---|---|
| Example | Gel time [min] | Onset temperature [° C.] |
| 2 | 122 | 142 |
| 3 | 67 | 128 |

To test the hot-melt resins of the invention from Examples 2 and 3 for their curing behavior, samples of the resin powders 2 and 3 were weighed out into deep metal lids in an amount such that the thickness after melting was 10 mm. The powder-filled metal lids are subjected to melting in an oven at 105° C. for 10 minutes to give substantially bubble-free resins 2 and 3. The metal lids containing the melts 2 and 3 are then irradiated on a plate preheated to 110° C. under a mercury vapor lamp with an energy of 14 mJ/cm2 for 5 minutes, forming an almost tack-free skin on the resin surface. After irradiation, the metal lids are subjected to curing in the oven at 140° C. in 20 minutes. This gives hard, crack-free resin blocks 2 and 3. The mass losses in the course of the curing process are <1% for both resins.

The invention claimed is:

1. A process for the melt impregnation or melt coating of components, absorbent materials or primed and unprimed substrates comprising
   (i) melting a hot-melt resin,
   (ii) applying the resultant resin melt onto and into the components, absorbent materials or primed or unprimed substrates,
   (iii) curing the applied resin melt by heat and/or actinic radiation,
   wherein the hot-melt resin comprises
   A) at least one solid unsaturated polyester and
   B) at least one oligomeric and/or polymeric crosslinking agent which is copolymerizable with said polyester and which in respect of the oligomeric and/or polymeric main chain comprises at least one terminal and/or pendant isoprenyl group,
   wherein at least one of the unsaturated polyesters (A) has at least one structural unit of the general formula I

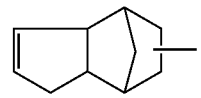

(I)

and/or at least one structural unit of the general formula II

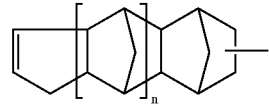

(II)

in which the index n is an integer from 1 to 10, wherein component (A) is different than component (B), wherein the application (ii) takes place by placing at least one shaped part comprising the hot-melt resin and adapted in its shape to the shape of the component, absorbent material or primed and unprimed substrate to be coated onto the component, absorbent material or primed and unprimed substrate, and melting the shaped part, or by dipping, hot-dipping, dip-rolling, flooding, casting, vaccuum impregnation, vacuum pressure impregnation or trickling.

2. The process as claimed in claim 1, wherein the crosslinking agents (B) have at least two terminal and/or pendant isoprenyl groups.

3. The process as claimed in claim 1, wherein the oligomer and polymer main chains are formed by linear, branched and/or dendrimeric, saturated and/or unsaturated polyesters, polyester amides, and/or polyurethanes.

4. The process as claimed in claim 1, wherein at least one of the crosslinking agents (B) has it least one structural unit of the general formula I

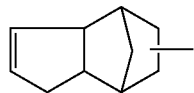

and/or at least one structural unit of the general formula II

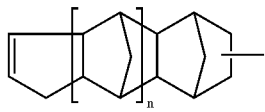

in which the index n is an integer from 1 to 10'.

5. The process as claimed in claim 1, wherein said hot-melt resin further comprises additives.

6. The process as claimed in claim 5, wherein said hot-melt resin further comprises a photoinitiator that is bonded chemically to at least one of the unsaturated polyesters (A) and/or at least one of the crosslinking agents (B).

7. A process for the melt impregnation or melt coating of components, absorbent materials or primed and unprimed substrates comprising
(i) melting a hot-melt resin,
(ii) applying the resulting resin onto and into the components, absorbent materials or primed or unprimed substrates,
(iii) curing the applied resin melt by heat and/or actinic radiation, wherein the hot-melt resin comprises
A) at least one solid unsaturated polyester and
B) at least on oligomeric and/or polymeric crosslinking agent which is copolymerizable with said polyester and which in respect to the oligomeric and/or polymeric main chain comprises at least one terminal and/or pendant isoprenyl group,
wherein at least one of the unsaturated polyesters (A) has at least one structural unit of the general formula I

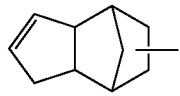

and/or at least one structural unit of the general formula II

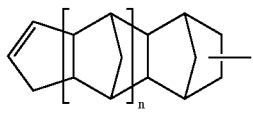

in which the index n is an integer from 1 to 10,
wherein the component (A) is different than component (B),
wherein the applied hot-melt resin is partially gelled before process step (iii).

8. A process for the melt impregnation or melt coating of components, absorbent materials or primed and unprimed substrates comprising
(i) melting a hot-melt resin,
(ii) applying the resultant resin melt onto and into the components, absorbent materials or primed or unprimed substrates,
(iii) curing the applied resin melt by heat and/or actinic radiation,
wherein the hot-melt resin comprises
A) at least one solid unsaturated polyester and
B) at least one oligomeric and/or polymeric crosslinking agent which is copolymerizable with said polyester and which in respect of the oligomeric and/or polymeric main chain comprises at least one terminal and/or pendant isoprenyl group,
wherein at least one of the unsaturated polyesters (A) has at least one structural unit of the general formula I

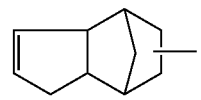

and/or at least one structural unit of the general formula II

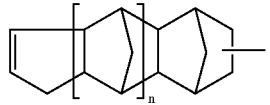

in which the index n is an integer from 1 to 10,
wherein component (A) is different than component (B),
wherein the applied hot-melt resin in process step (iii) is cured by thermal curing by means of electricity, induction, hot fluids, especially hot gases, microwave radiation and/or IR radiation, especially near infrared (NIR) radiation.

9. A process for the melt impregnation or melt coating of components, absorbent materials or primed and unprimed substrates comprising
(i) melting a hot-melt resin,
(ii) applying the resultant resin melt onto and into the components, absorbent materials or primed or unprimed substrates,
(iii) curing the applied resin melt by heat and/or actinic radiation,
wherein the hot-melt resin comprises
A) at least one solid unsaturated polyester and
B) at least one oligomeric and/or polymeric crosslinking agent which is copolymerizable with said polyester and which in respect of the oligomeric and/or polymeric main chain comprises at least one terminal and/or pendant isoprenyl group, wherein at least one of the unsaturated polyesters (A) has at least one structural unit of the general formula I

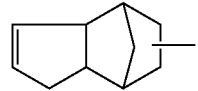
(I)

and/or at least one structural unit of the general formula II

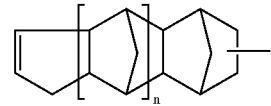
(II)

in which the index n is an integer from 1 to 10, wherein component (A) is different than component (B), wherein the applied hot-melt resin in process step (iii) is cured by electromagnetic radiation and/or corpuscular radiation.

* * * * *